US008156247B2

(12) United States Patent
McMillen (10) Patent No.: US 8,156,247 B2
(45) Date of Patent: Apr. 10, 2012

(54) SYSTEMS AND METHODS FOR REDUCING NETWORK PERFORMANCE DEGRADATION

(75) Inventor: Robert James McMillen, Carlsbad, CA (US)

(73) Assignee: LSI Corportion, Milpitas, CA (US)

( * ) Notice: Subject to any disclaimer, the term of this patent is extended or adjusted under 35 U.S.C. 154(b) by 629 days.

(21) Appl. No.: 12/113,083

(22) Filed: Apr. 30, 2008

(65) Prior Publication Data

US 2008/0270833 A1 Oct. 30, 2008

Related U.S. Application Data

(60) Provisional application No. 60/915,013, filed on Apr. 30, 2007.

(51) Int. Cl.
*G06F 15/173* (2006.01)
*G06F 13/28* (2006.01)

(52) U.S. Cl. ........ 709/240; 709/224; 709/242; 711/113; 711/125; 711/144

(58) Field of Classification Search .................. 709/200, 709/224, 240, 242; 704/255; 707/3; 711/113, 711/125, 144; 726/23–24
See application file for complete search history.

(56) References Cited

U.S. PATENT DOCUMENTS

| 5,305,389 | A  | * | 4/1994  | Palmer ........................... 382/305 |
| 5,748,547 | A  | * | 5/1998  | Shau ............................. 365/222 |
| 5,829,024 | A  | * | 10/1998 | Sato .............................. 711/122 |
| 6,453,278 | B1 | * | 9/2002  | Favor et al. ...................... 703/27 |
| 7,464,254 | B2 | * | 12/2008 | Sharangpani et al. ......... 712/300 |
| 2002/0099691 | A1 | * | 7/2002 | Lore et al. ......................... 707/2 |
| 2003/0072387 | A1 | * | 4/2003 | Skinner ......................... 375/296 |
| 2003/0221013 | A1 | * | 11/2003 | Lockwood et al. ........... 709/231 |
| 2004/0215593 | A1 | * | 10/2004 | Sharangpani et al. ........... 707/1 |
| 2005/0261877 | A1 | * | 11/2005 | Shelest et al. ................. 702/186 |
| 2007/0124146 | A1 | * | 5/2007 | Lunteren ....................... 704/255 |
| 2007/0159653 | A1 | * | 7/2007 | Dholakia et al. ............. 358/1.15 |
| 2009/0198660 | A1 | * | 8/2009 | Kottomtharayil ................ 707/3 |

* cited by examiner

*Primary Examiner* — Patrice Winder
*Assistant Examiner* — Ebrahim Golabbakhsh (57) ABSTRACT

Systems and methods for reducing network performance degradation by assigning caching priorities to one or more states of a state machine are disclosed herein. In one embodiment, the method comprises storing, in a memory, a state machine corresponding to one or more patterns to be detected in a data stream, wherein the state machine comprises a plurality of states, generating a test data stream based on the one or more patterns, traversing the state machine with the test data stream, determining a respective hit quantities associated with each of the plurality of states, the hit quantities each indicating a number of accesses to a corresponding state by the traversing, and associating a caching priority to at least some of the plurality of states based on the hit quantities of the respective states.

20 Claims, 10 Drawing Sheets

FIG. 1

FIG. 2 car
cat
cola
cole
colin
corel
corn
correct
cortizone
eel
late
leer
lot
ore
ova
porek
porel
pores
relate
relative
touce
touch
touco
xola
xolin
zorel
zoret

Number of Classes is 18.
Class 1:\x00 \x01 \x02 \x03 \x04 \x05 \x06 \a \b \t
\n \v \f \r \x0E \x0F \x10 \x11 \x12 \x13
\x14 \x15 \x16 \x17 \x18 \x19 \x1A \x1B \x1C \x1D
\x1E \x1F ' ' ! " # $ % & '
( ) * + , - . / 0 1
2 3 4 5 6 7 8 9 : ;
< = > ? @ A B C D E
F G H I J K L M N O
P Q R S T U V W X Y
Z [ \ ] ^ _ ' b d f
g j m q w y { | } ~
\x7F \x80 \x81 \x82 \x83 \x84 \x85 \x86 \x87 \x88
\x89 \x8A \x8B \x8C \x8D \x8E \x8F \x90 \x91 \x92
\x93 \x94 \x95 \x96 \x97 \x98 \x99 \x9A \x9B \x9C
\x9D \x9E \x9F \xA0 \xA1 \xA2 \xA3 \xA4 \xA5 \xA6
\xA7 \xA8 \xA9 \xAA \xAB \xAC \xAD \xAE \xAF \xB0
\xB1 \xB2 \xB3 \xB4 \xB5 \xB6 \xB7 \xB8 \xB9 \xBA
\xBB \xBC \xBD \xBE \xBF \xC0 \xC1 \xC2 \xC3 \xC4
\xC5 \xC6 \xC7 \xC8 \xC9 \xCA \xCB \xCC \xCD \xCE
\xCF \xD0 \xD1 \xD2 \xD3 \xD4 \xD5 \xD6 \xD7 \xD8
\xD9 \xDA \xDB \xDC \xDD \xDE \xDF \xE0 \xE1 \xE2
\xE3 \xE4 \xE5 \xE6 \xE7 \xE8 \xE9 \xEA \xEB \xEC
\xED \xEE \xEF \xF0 \xF1 \xF2 \xF3 \xF4 \xF5 \xF6
\xF7 \xF8 \xF9 \xFA \xFB \xFC \xFD \xFE \xFF
Class 2: a
Class 3: c
Class 4: e
Class 5: h
Class 6: i
Class 7: k
Class 8: l
Class 9: n
Class 10: o
Class 11: p
Class 12: r
Class 13: s
Class 14: t
Class 15: u
Class 16: v
Class 17: x
Class 18: z

FIG. 5 ca
ca
col
col
coli
core
cor
correc
cortizon
ee
lat
lee
lo
or
ov
pore
pore
pore
relat
relativ
touc
touc
touc
xol
xoli
zore
zore

*FIG. 6*

Total Accesses is 278
Total Accesses greater than 20 is 48 (17.3%)
Total Addresses hit > 20 time is 2

Total Entries: 86

| | | | |
|---:|---|---:|---|
| 2: | 1 | 78: | 1 |
| 4: | 4 | 80: | 1 |
| 5: | 2 | 83: | 1 |
| 6: | 7 | 85: | 1 |
| 8: | 10 | 87: | 2 |
| 9: | 10 | 88: | 1 |
| 10: | 1 | 91: | 1 |
| 12: | 2 | 93: | 1 |
| 17: | 3 | 94: | 1 |
| 18: | 4 | 97: | 1 |
| 20: | 1 | 99: | 1 |
| 22: | 1 | 101: | 1 |
| 24: | 2 | 102: | 1 |
| 28: | 1 | 104: | 1 |
| 30: | 1 | 107: | 3 |
| 32: | 5 | 108: | 3 |
| 33: | 2 | 110: | 1 |
| 35: | 3 | 112: | 2 |
| 36: | 4 | 116: | 1 |
| 37: | 3 | 127: | 2 |
| 38: | 4 | 132: | 1 |
| 39: | 3 | 147: | 1 |
| 41: | 2 | 150: | 1 |
| 43: | 3 | 158: | 1 |
| 44: | 2 | 160: | 1 |
| 47: | 3 | 167: | 3 |
| 49: | 1 | 187: | 3 |
| 50: | 1 | 1025: | 27 |
| 52: | 4 | 1026: | 5 |
| 53: | 6 | 1027: | 13 |
| 54: | 1 | 1028: | 7 |
| 57: | 3 | 1030: | 4 |
| 58: | 1 | 1032: | 10 |
| 59: | 2 | 1033: | 1 |
| 61: | 3 | 1034: | 21 |
| 63: | 2 | 1035: | 3 |
| 64: | 1 | 1036: | 7 |
| 65: | 2 | 1038: | 7 |
| 66: | 3 | 1039: | 3 |
| 68: | 1 | 1040: | 2 |
| 71: | 3 | 1041: | 2 |
| 73: | 2 | 1042: | 3 |
| 75: | 3 | | |
| 77: | 2 | | |

*FIG. 7*

|    | 0    | 1    | 2    | 3    |
|----|------|------|------|------|
| 0  | L001 | L002 |      | U005 |
| 1  |      | L002 | U003 |      |
| 2  | L001 |      | U003 | U005 |
| 3  | L001 | L002 |      |      |
| 4  |      | L002 | U004 | U005 |
| 5  | L001 | L002 | U004 |      |
| 6  | L001 | U007 |      | L006 |
| 7  | L001 | U007 | U004 |      |
| 8  |      |      |      | L006 |
| 9  | U008 | L009 | U004 | L010 |
| 10 |      | L009 |      |      |
| 11 | U011 |      | L012 |      |
| 12 | U011 | U007 | U013 | U014 |
| 13 | U011 |      |      |      |
| 14 |      |      | L012 | U014 |
| 15 | U011 |      |      | U014 |

*FIG. 9*

SYSTEMS AND METHODS FOR REDUCING NETWORK PERFORMANCE DEGRADATION

CROSS-REFERENCE TO RELATED APPLICATIONS

This application claims the benefit under 35 U.S.C. 119(e) of U.S. Provisional Application No. 60/915,013, filed on Apr. 30, 2007, which is incorporated herein by reference in its entirety. The subject matter of this application is related to U.S. patent application Ser. No. 12/113,055, filed on Apr. 30, 2008, entitled "STATE MACHINE COMPRESSION,", which is hereby incorporated by reference in its entirety.

BACKGROUND OF THE INVENTION

1. Field of the Invention

The present invention relates to inspection of network traffic to detect patterns in the traffic.

2. Description of the Related Technology

Today's Internet is rife with security threats that take the form of viruses and denial-of-service attacks, for example. Furthermore, there is much unwanted incoming information sent in the form of spam and undesired outgoing information containing corporate secrets. In large web server installations, there is the need to load balance traffic based on content of the individual communications. These trends, and others, drive demand for more sophisticated processing at various points in the network and at server front ends at wire speeds and near-wire speeds. These demands have given rise to anti-virus, intrusion detection and prevention, and content filtering technologies. At their core, these technologies depend on pattern matching. For example, anti-virus applications may look for fragments of executable code and Java and Visual Basic scripts that correspond uniquely to previously-captured viruses. Similarly, content filtering applications may look for a threshold number of words that match keywords on lists representative of the type of content (e.g., spam) to be identified. In like manner, enforcement of restricted access to web sites may be accomplished by checking the URL (Uniform Resource Locator) identified in the HTTP header against a forbidden list.

SUMMARY

In one embodiment, a method of associating respective caching priorities to each of a plurality of states of a state machine comprises storing a state machine corresponding to one or more patterns to be detected in a data stream, wherein the state machine comprises a plurality of states, generating a test data stream based on the one or more patterns, traversing the state machine with the test data stream, determining respective hit quantities associated with each of the plurality of states, the hit quantities each indicating a number of accesses to a corresponding state by the traversing, and associating a caching priority to at least some of the plurality of states based on the hit quantities of the respective states.

In one embodiment, a method of detecting patterns in a data stream comprises storing, in a first memory, a state machine corresponding to one or more patterns to be detected in a data stream, wherein the state machine comprises a plurality of states each being associated with one or more state transition instructions, loading, into a second memory, one or more state transition instructions associated with a first state, wherein the second memory is configured to have faster access times than the first memory, and loading, into the second memory, one or more state transition instructions associated with a second state, wherein memory locations storing the one or more state transition associated with the first state are not available for being overwritten with one or more state transition instructions associated with the second state unless the second state is associated with a higher caching priority than a caching priority of the first state.

In one embodiment, a system for associating respective caching priorities to each of a plurality of states of a state machine comprises a memory configured to store a state machine corresponding to one or more patterns to be detected in a data stream, wherein the state machine comprises a plurality of states, a test data stream generator configured to generate a test data stream based on the one or more patterns, an emulator configured to traverse the state machine with the test data stream and determine respective hit quantities associated with each of the plurality of states, the hit quantities each indicating a number of accesses to a corresponding state by the traversing, and a prioritizing module configured to associate a caching priority to at least some of the plurality of states based on the hit quantities of the respective states.

DETAILED DESCRIPTION

The following detailed description is directed to certain specific sample aspects of the invention. However, the invention can be embodied in a multitude of different ways as defined and covered by the claims. In this description, reference is made to the drawings wherein like parts are designated with like numerals throughout.

When data that is transmitted across a network, such as the Internet, arrives at a server, having survived all the routing, processing, and filtering that may have occurred in the network, it may be further processed. This further processing may occur all at once when the information arrives, as in the case of a web server. Alternatively, this processing may occur at stages, with a first one or more stages removing layers of protocol with one or more intermediate forms being stored on disk, for example. Later stages may also process the information when the original payload is retrieved, as with an e-mail server, for example. In such an information processing system, the need for high-speed processing becomes increasingly important due to the need to complete the processing in a network and also because of the volume of information that must be processed within a given time.

Regular expressions are well-known in the prior art and have been in use for some time for pattern matching and lexical analysis. An example of their use is disclosed by K. L. Thompson in U.S. Pat. No. 3,568,156, issued Mar. 2, 1971, which is hereby incorporated by reference in its entirety. U.S. patent application Ser. No. 10/851,482, filed on May 21, 2004, and entitled, "Regular Expression Acceleration Engine and Processing Model," is also hereby incorporated by reference in its entirety.

The systems and methods described herein are directed towards deep content inspection of networking traffic, such as inspection of packet payload data for character strings matching known spam, virus, or other patterns. Deep content inspection may be performed, for example, by applications that use regular expressions to look for patterns in the packet data that indicate malicious content such as viruses, spam, and/or attempts to interfere with proper functioning of the network by gaining unauthorized access to resources and/or hampering performance. In other embodiments, character patterns associated with other undesired network traffic may also be defined by regular expressions.

In certain embodiments, inspection of packet content beyond only the packet header may be performed using high speed hardware that can look at all the bytes in a packet using a programmable state machine engine. In one embodiment, a compiler converts a set of regular expressions into one or more deterministic finite automata (DFA) comprising multiple states, and a state machine engine executes the DFA created by the compiler. The DFA may comprise multiple states, such as terminal states, that are associated with matches (or near matches) of one or more respective regular expressions. Thus, by traversing the DFA using characters of a packet, such as characters in the packet header and/or the packet payload, the state machine engine may locate character strings that match the regular expressions indicative of viruses, spam, or other undesired character sequences.

Contemporary applications use thousands to tens of thousands of regular expressions to detect attacks. When compiled, those expressions consume a great deal of instruction memory. One solution to the problem of making a large amount of memory appear to be fast may be implemented, similar to that used in modern CPU architectures, by using caching techniques. Unfortunately, however, cache-based regular expression engines may be more vulnerable to attacks than high-speed memory, such as SRAM-based designs, for example, which themselves have the drawback of being very expensive.

To be effective, cache-based designs should achieve very high hit rates, such as, for example, 98% or more. In practice, such a hit rate may be achievable in normal operation due to the fact that the state machine spends most of its time accessing start states and other states that are within a few (e.g., two to four) transitions from the start. That is, they spend most of their time determining that there is no match and very few transitions are required to do that. It's only when an actual match (or near match) occurs that states deeper within the machine are accessed, which seldom occurs in typical network security applications. However, when a path (or branch) of the DFA is traversed past the initial states of the state machine, such as the states that are cached by the state machine engine, slowing of the state machine engine occurs as information regarding the non-cached states is accessed, typically from a slower memory that stores all, or a larger portion, of the state machine. Accordingly, when a character string matches, or is similar to, a pattern defined in a regular expression, operation of the regular expression engine may be slowed as off-cache data is accessed.

In a worst case attack scenario, the attacker knows which expressions or patterns are in use. To drive the hit rate towards 0, the attacker may send every pattern in the DFA with the last byte (or the last few bytes) of each pattern modified to prevent an actual match. That will force the engine to traverse entire paths of the state machine, and access the corresponding instructions in memory without locating any matches. With the cache virtually disabled, the processing rate may be limited by the access rate of the secondary memory, which is may be one, two, or more orders of magnitude slower than the cache.

Figure 1:
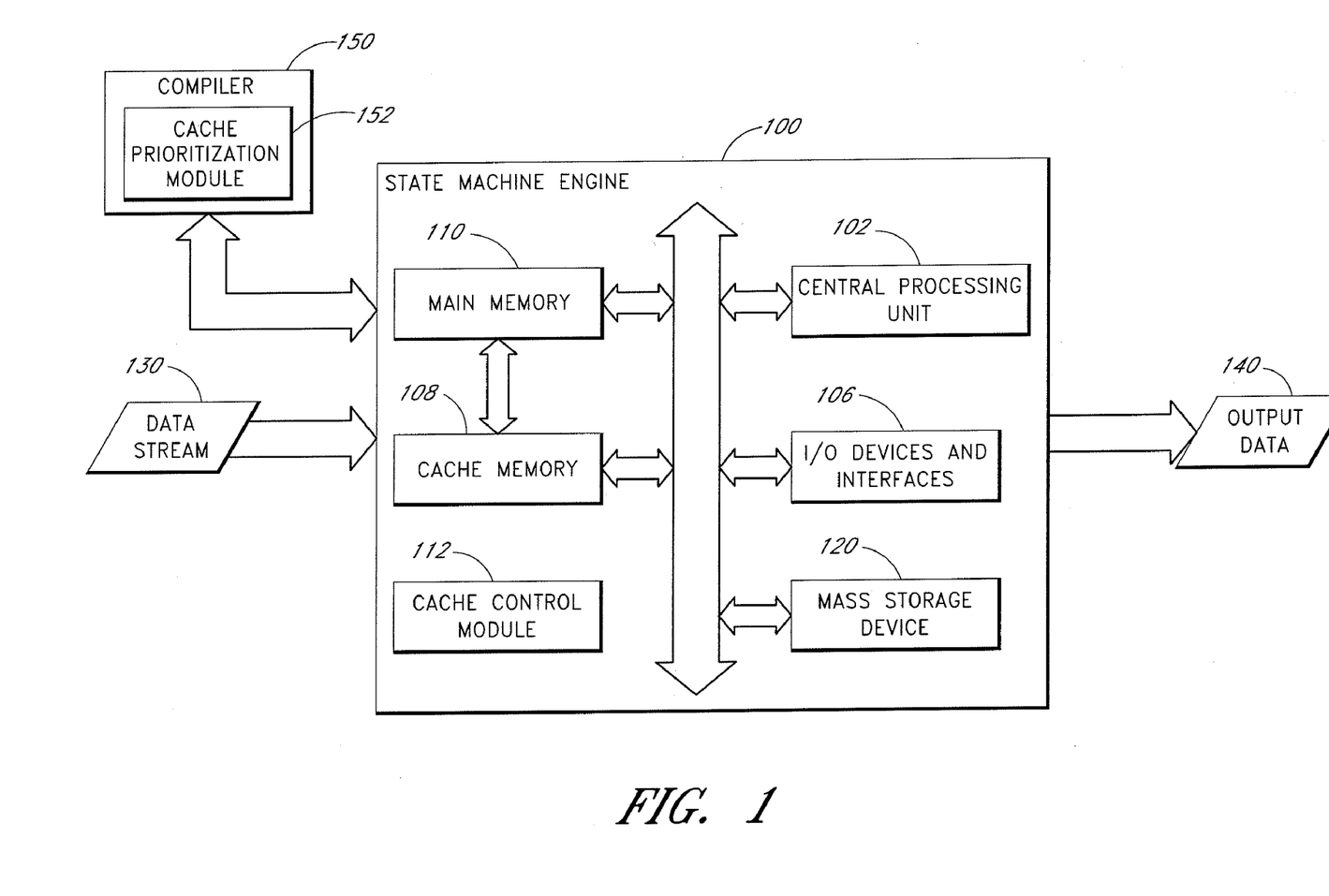
FIG. 1 is a functional block diagram of a system capable of implementing certain methods disclosed herein.

FIG. 1 is a block diagram of a compiler 150 in communication with a state machine engine 100. The state machine engine 100 may comprise, for example, a reconfigurable logic device, such as a field programmable gate array (FPGA), an application specific integrated circuit (ASIC), or a multi-chip module. In one embodiment the state machine engine 100 comprises components of a network interface card (NIC) that are configured for communication with a network server. In another embodiment, the state machine engine 100 may comprise a logic design that is used by one or more third parties in products designed, manufactured, and/or sold by the third party. For example, the state machine engine 100 may comprise a logic design that is included in an FPGA, ASIC, and/or system-on-chip (SOC) that is implemented by a third party, along with other logic of the third party. In other embodiments, components of the state machine engine 100 may be implemented on a personal computer or a dedicated processing unit for monitoring web traffic.

In the embodiment of FIG. 1, the state machine engine 100 comprises a central processing unit (CPU) 102, a cache memory 108, and a main memory 110, as well as I/O devices and interfaces 106 and a mass storage device 120. In other embodiments, the state machine engine 100 may comprise fewer components, such as only the cache control module 112, main memory 110, cache memory 108, or any other combination of modules illustrated in FIG. 1. In one embodiment, the state machine engine 100 is configured to traverse a state machine that is stored in the main memory 110 and/or the cache memory 108 in response to characters in an input data stream 130, which may be received from a network (not shown), for example. The state machine engine 100 may be further configured to provide the output data 140 that is indicative of matches located in the processing of the input data stream 130. In one embodiment, the output data 140 is provided to one or more further processing modules, either external or internal to the state machine engine 100, that use the output data 140.

In the embodiment of FIG. 1, a compiler 150 is depicted in communication with the state machine engine 100 (also referred to herein as the "system 100"). In one embodiment, the compiler 150 is configured to compile a plurality of regular expressions, or other strings that identify character patterns of interest, into a state machine, such as a DFA, for example, that is usable by the state machine engine 100 in evaluating the data stream 130. In the embodiment of FIG. 1, the compiler comprises a cache prioritization module 152 that is configured to assign caching priorities to states of a compiled state machine for use by the state machine engine 100 in determining which states to maintain in the cache 108 in order to reduce network performance degradation. In one embodiment, the cache prioritization module assigns states one of two levels, such as lockable and non-lockable, while in other embodiments, additional prioritization levels may be used.

In the embodiment of FIG. 1, a cache control module 112 of the system 100 is configured to determine which states of a state machine received from the compiler 150 (e.g., that are stored in the main memory 110) should be transferred and/or maintained in the cache memory 108 in order to increases the speed and efficiency of processing the input data stream 130. As described in further detail below, the cache control module 112 may be configured to identify certain "locked" states and maintain those locked stated in the cache memory. Depending on the embodiment, the cache control module 112 may be part of the cache memory 108, part of the main memory 110, and/or a separate module that interfaces with them main memory 110 and/or cache memory 108.

In general, the word "module," as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage.

In one embodiment, the compiler 150 comprises a desktop, laptop, mobile, or other type of computer that is controlled and coordinated by server and/or desktop computer operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the compiler 150 may be controlled by a proprietary operating system. Conventional operating systems control and schedule computer processes for execution, perform memory management, provide file system, networking, and I/O services, and provide a user interface, such as a graphical user interface ("GUI"), among other things. In one embodiment, the compiler 150 executes compiler code, such as a software application for compiling regular expressions into a state machine, in order to generate a state machine for use by the state machine engine 100. In one embodiment, the compiler 150 comprises the cache prioritization module 152, while in other embodiments the compiler 150 interfaces with the cache prioritization module 152.

The exemplary system 100 includes one or more commonly available input/output (I/O) devices and interfaces 106, such as a keyboard, mouse, touchpad, and printer. In one embodiment, the I/O devices and interfaces 106 include one or more display device, such as a monitor, that allows the visual presentation of data to a user. More particularly, a display device provides for the presentation of GUIs, application software data, and multimedia presentations, for example. The system 100 may also include one or more multimedia devices, such as speakers, video cards, graphics accelerators, and microphones, for example. In other embodiments, the system does not include any I/O devices and interfaces 106 or may include only interfaces to receive the data stream 130 and/or to provide output data 140 to another computing system, for example. The compiler 150 may comprise any one or more of the I/O devices and interfaces.

In the embodiment of FIG. 1, the system 100 may be in communication with a network (not shown), such as any combination of one or more LANs, WANs, or the Internet, for example, via a wired, wireless, or combination of wired and wireless, via the communication link. The network may communicate with various computing devices, such as the compiler 150, and/or other electronic devices via wired or wireless communication links. For example, the data stream 130 may be received from a network and comprise data, such as web or email data, for example, transmitted from one or more device across the Internet.

The central processing unit 102 may be any conventional general purpose single- or multi-chip microprocessor such as a Pentium® processor, Pentium II® processor, Pentium III® processor, Pentium IV® processor, Pentium® Pro processor, Xeon® processor, a 8051 processor, a MIPS® processor, a PowerPC® processor, or an ALPHA® processor. In addition, the processor may be any conventional special purpose microprocessor, such as an ASIC or a digital signal processor. In one embodiment, the cache control module 112 comprises the central processing unit 102, such as in an ASIC or a hardware logic device. In this embodiment, the cache control module 112 may be configured to evaluate the data stream 130 independent of any separate CPU.

In the embodiment of FIG. 1, the central processing unit 102 is coupled to both the cache 108 and the main memory 110 which are configured to store, among other things, state machine instructions for deep content inspection of content over a network. The cache 108 and/or main memory 110 may also be external devices or systems, for example, disk drives or tape drives. The cache 108 or main memory 110 may also be fast semiconductor storage (chips), for example, Random Access Memory (RAM), such as Static RAM or Dynamic RAM, which are connected to the central processing unit 102. Other types of memory include bubble memory and core memory. In some embodiments, the cache 108 is configured to store less information than the main memory 110 and/or to be accessed faster than the main memory 110. In many cases, however, the cache is more expensive and thus smaller than the main memory 110.

In one embodiment, the system 100 is configured to minimize certain limitations of cache based regular expression engines, such as speed and efficiency limitations that become more apparent when the system 100 is under a highly knowledgeable attack and/or when finding actual matches or close matches. In one embodiment, the cache prioritization module 152 of the compiler 150 analyzes regular expressions to determine which states are visited most frequently when byte sequences that fully match the regular expressions (e.g., representative of viruses or other undesirable content) are scanned. The cache prioritization module 152 may then assign priorities to certain states based on access frequency of the respective states. The system 100 may comprise: (1) an instruction locking mechanism for maintaining high priority state information in the cache 108, e.g., as determined by the compiler 150, and/or (2) augmented multi-character processing instructions for a regular expression engine, such as is disclosed in U.S. patent application Ser. No. 12/113,055, filed on Apr. 30, 2008, entitled "STATE MACHINE COMPRESSION,", which is hereby incorporated by reference in its entirety.

Figure 2:
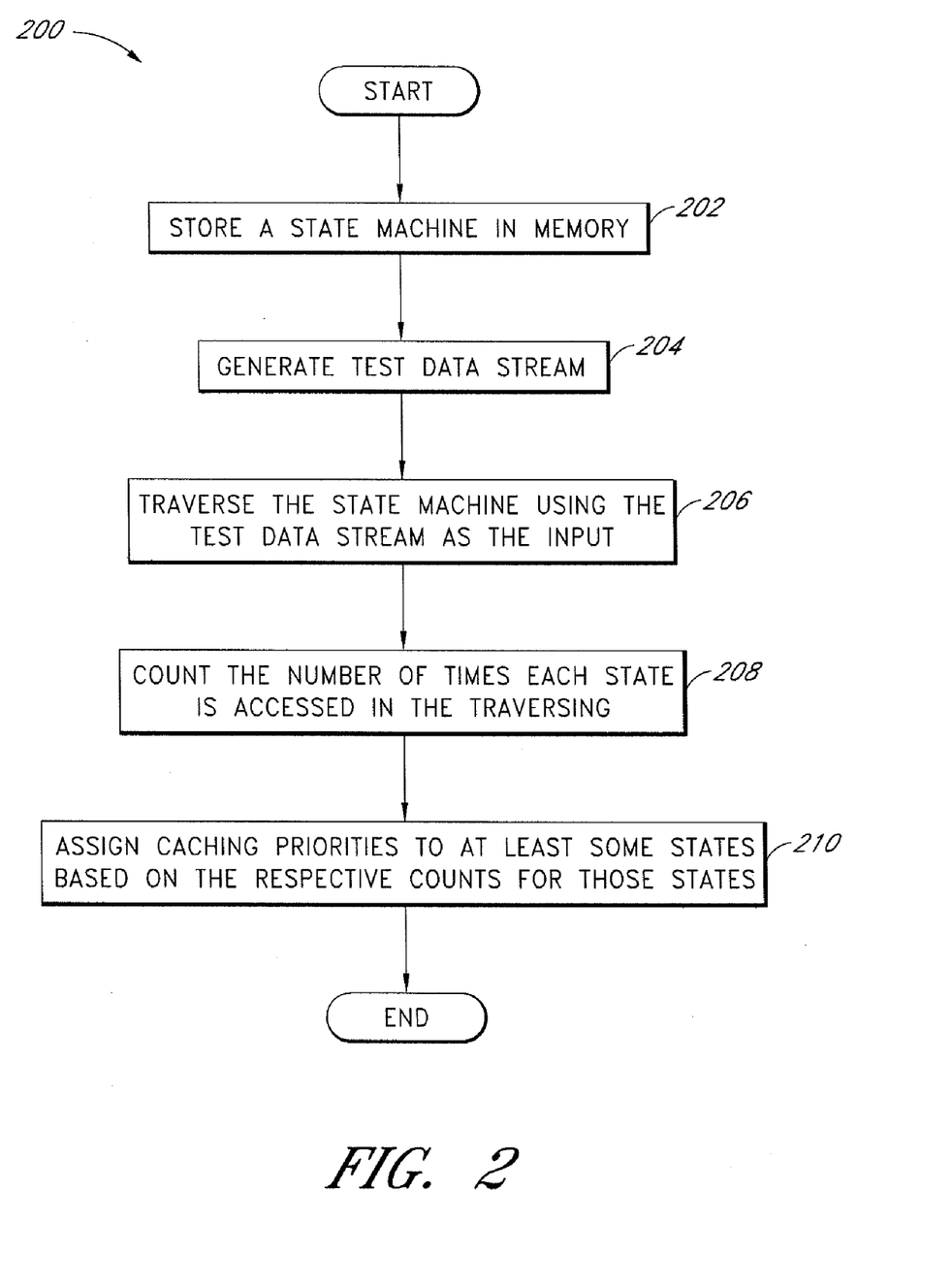
FIG. 2 is a flowchart illustrating one embodiment of a method of assigning caching priorities for the states in a state machine.

FIG. 2 is a flowchart illustrating one embodiment of a method of assigning caching priorities for the states in a state machine. Depending on the embodiment, the method of FIG. 2 may include fewer or additional blocks and the blocks may be performed in a different order than is illustrated. In one embodiment, the method 200 may be performed by the compiler 150 executing the cache prioritization module 152. In other embodiments, the system 100 may include the cache prioritization module 152 and may, therefore, execute the method of FIG. 2. The method 200 may be performed offline, such as prior to traversal of the state machine based on the input data stream 130. Alternatively, the method 200 can be performed routinely (or dynamically), as the state machine (and its usage) is updated.

In block 202, a state machine is stored in a memory of the compiler 150 or a memory that is accessible to the compiler. The state machine may correspond, for example, to a list of patterns being searched for in traffic over a network 112.

Moving to block 204, a test data stream is generated. This test data stream may be based on the patterns that are to be detected by the state machine stored in the memory. For example, byte sequences may be generated that match each regular expression, or match all but a last one or more character patterns of the regular expressions. In the case of an application in which literal strings are used for the expressions, e.g., anti-virus signatures, there may only be one byte sequence per pattern. For each sequence, the final byte or bytes may be modified to be different than that in the expression. This can be done by one or more of multiple methods, such as, for example, adding one to the byte pattern, or performing an exclusive-or operation between the byte pattern and the hexadecimal value 0xFF. In the case of regular expressions containing wild cards and character classes, multiple byte sequences that match possible variations of the regular expression pattern may be generated. In certain embodiments, such as when the total number of possible variations is excessive, random number methods can be used to produce a broad sample of representative patterns.

Next, in block 206 the compiler 150, for example, traverses the state machine using the test data stream as the input. In one embodiment, this is accomplished by feeding the generated patterns into a software emulation of the regular expression engine. In one embodiment, the software emulator traverses states of the DFA using an input string comprising the byte sequences described above.

In block 208, the cache prioritization module 152, for example, tracks the number of times each state is accessed in the traversing. For example, in an embodiment using a software emulator of the regular expression engine, as the emulator traverses states of the DFA, a count of the number of times each state instruction is accessed is tallied. The counts associated with respective states may then be analyzed to determine which of the states are most frequently accessed by the test data stream. Accordingly, the states that may be most frequently accessed by byte patterns comprising viruses, spam, or byte patterns that are constructed as near matches to virus or spam patterns, for example, may be determined.

Finally, in block 210, the cache prioritization module 152, for example, assigns caching priorities to states based on their respective counts. Caching priorities may be as simple as labeling each state as "locked" or "unlocked," or may be more quantitative. States that are labeled as "locked" may also be referred to as "locking" states. After generation of the state machine, such as by the compiler 150, with the prioritizations indicated, as determined by the cache prioritization module 152, the state machine is transmitted to the state machine engine 100. In one embodiment, a certain state machine may be transmitted to multiple state machine engines for monitoring of network traffic, for example. In one embodiment, the state machine engine generated by the compiler 152 is preloaded into the state machine engine 100, such as in an ASIC, FPGA, or reconfigurable logic device.

Depending on the embodiment, prior to accessing the data stream 130, certain locking states may be preloaded into the state machine engine 100 cache memory 108, while in other embodiments certain locking states are not stored into the cache 108 until they are first required by the system 100. In one embodiment, a predetermined number N of the most frequently accessed instructions are tagged as lockable, where N is the number of available positions in the lockable portion of the cache 108. In this embodiment, the cache 108 can be preloaded with the tagged instructions and they will not be replaced so long as the corresponding DFA is being evaluated by the system 100. Alternatively, the M most frequently used instructions can be tagged, where M may be greater than or less than N. In that case, the cache control module 112, for example, may only replace locked instructions in the cache 108 with other lockable instructions. Further, a threshold, T, could be used to determine which M instructions are tagged, where T is, for example, a percentage of the most frequently accessed instructions. In one embodiment, the cache control module 100, or another related device, comprises means for programmably controlling the percentage of the cache 108 that may contain locked instructions. As an example, dedicating 2 KB of a 16 KB cache to locked instructions may be sufficient in an anti-virus application to substantially reduce the impact of a worst case attack. However, other applications may benefit from having more or less of the cache lockable.

In one embodiment, the cache prioritization module 152 adds an additional bit to each state instruction that signals whether that state instruction is locked. In other embodiments, other manners of indicating which state instructions are locked may be used. In a more quantitative caching priority system, a state in the cache may only be overwritten by a state with a higher caching priority. In this case, more than one bit may be added to each state instruction to signal its caching priority.

In one embodiment, a locked state is a state for which the associated state information is maintained in the cache memory while the DFA is being processed, rather than being replaced in the cache by state information of another state that may be needed by the state machine engine. Thus, states that are likely to be repeatedly traversed by the engine may be cached, even though the states may not be near a start state of the DFA. This may prevent the pattern-matching engine cache hit rate from dropping towards 0 when faced with a worst case attack. Thus, it may preserve the advantages of using a cached-based engine while overcoming certain disadvantages. In certain embodiments, the elements of the system (e.g., software that can analyze regular expressions to determine which states would be visited most often when byte sequences that fully match each expression are scanned and an instruction locking mechanism for maintaining high priority state information in the cache) alone can maintain a hit rate of about 40% while under worst case attack. In other embodiments, use of the elements may maintain a hit rate of more than about 10%, 20%, 30%, 50%, 60%, 70%, 80%, or 90% under worst cast attack.

Other manners of determining which instructions should be locked (or caching priorities in general) are also possible. For example, states associated with more commonly encountered virus signatures may be assigned higher priority. Alternatively, states associated with the signatures of viruses deemed to be most harmful may be assigned higher priority. In one embodiment, such as when patterns that will cause performance problems are known in advance of their actually being exploited, the compiler 150 may determine a priori which instructions need to be locked rather than trying to make the determination dynamically in hardware. This advantageously reduces the cost and complexity of hardware implementation of the prioritized caching method.

In one embodiment, the compiler 150 may generate a state machine comprising multi-character transition instruction each indicating transition instruction for two or more sequential states of a state machine. Because states generally have multiple out transitions, one instruction is typically fetched per character examined. However, it is always true for literal string signatures, and frequently true for regular expressions that, once a certain state is reached, deeper within the state machine, all subsequent transitions are of the single character type until a final state is reached. That is, matching continues if and only if one particular character is matched at each transition and fails otherwise. Thus, for such linear branches of the DFA, an instruction that specifies a sequence of P characters (or character classes), where P could be 2, 3, 4, or more, depending on the available instruction width, can reduce the cache miss rate by 1/P when matching a pattern or a byte sequence that is the same as the first part of a pattern, as in the attack scenario. Thus, the addition of a multi-character transition instruction may improve performance when there actually is a match or when normal (non attack) data is similar to an existing pattern, so that seldom accessed instructions must be fetched. Accordingly, use of multi-character instructions can further improve the cache hit rate of a state machine to about 70% or higher, such as 80%, 90%, or 95%, under a worst-case attack, for example. In an embodiment having 6 characters and/or character classes associated with certain state transition instructions, for example, a cache hit rate may increase by about 5%, 10%, 15%, or more. Such increases in cache hit rates may be sufficient to prevent the networking system from coming to a complete standstill while under attack. Additionally, in certain embodiments the use of state transition instructions that are associated with multiple characters and/or character classes reduces the compiled binary instruction 'footprint' of a state machine. For example, in an embodiment where 6 characters and/or character classes are associated with each state transition instruction, a compression ratio of the corresponding state machine may be on the order of around 10:1 or more. U.S. patent application Ser. No. 12/113,055, filed on Apr. 30, 2008, entitled "STATE MACHINE COMPRESSION,", describes methods for compressing state transition instructions, such as by combining transition conditions of multiple states into a single state transitions instruction.

Figure 3:
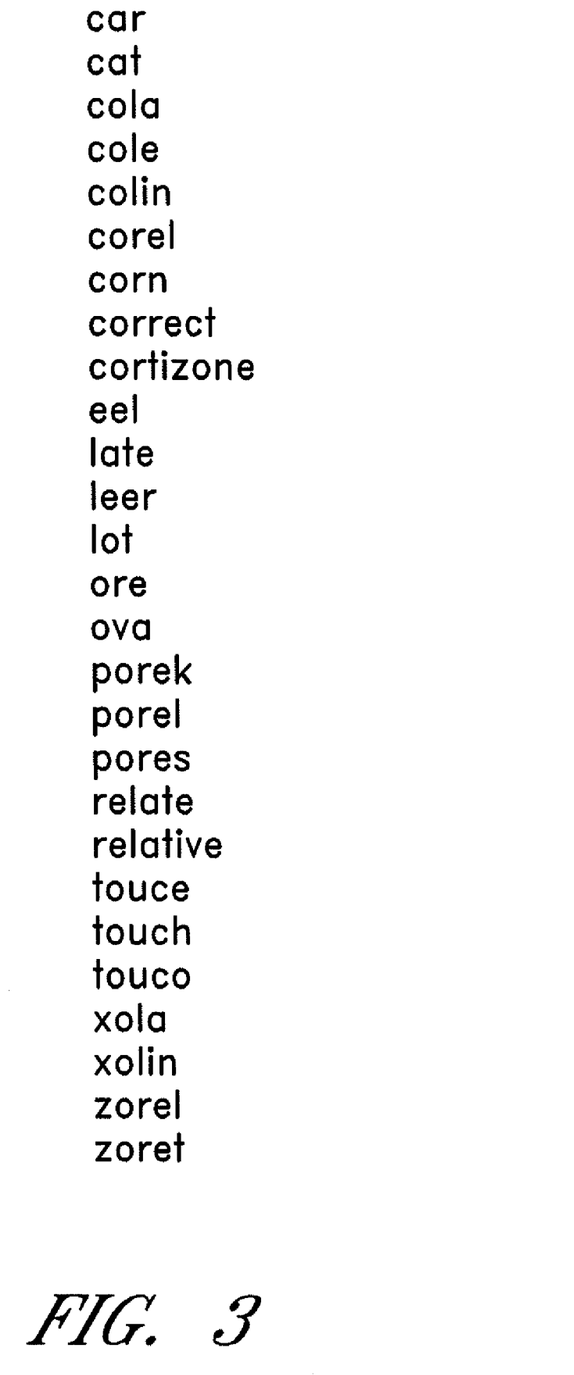
FIG. 3 is an exemplary list of patterns to be detected by the system.

FIG. 3 is an exemplary list of patterns to be detected by the system 100, such as in the data stream 130. As indicated in FIG. 3, the system 100 that receives input data streams would locate each of the strings, "car," "cat," "cola," etc. As those of skill in the art will recognize, character strings associated with spam, viruses, and/or other undesirable content may comprise many more characters, such as hundreds, thousands, or more characters. Additionally, the character strings to be located may be represented by regular expressions containing wild cards, character classes, repetition operators, and any other available pattern matching operators. Thus, the list of literal strings in FIG. 3 is for purposes of illustration only, to aid the reader in understanding certain embodiments of the methods described herein.

Figure 4:
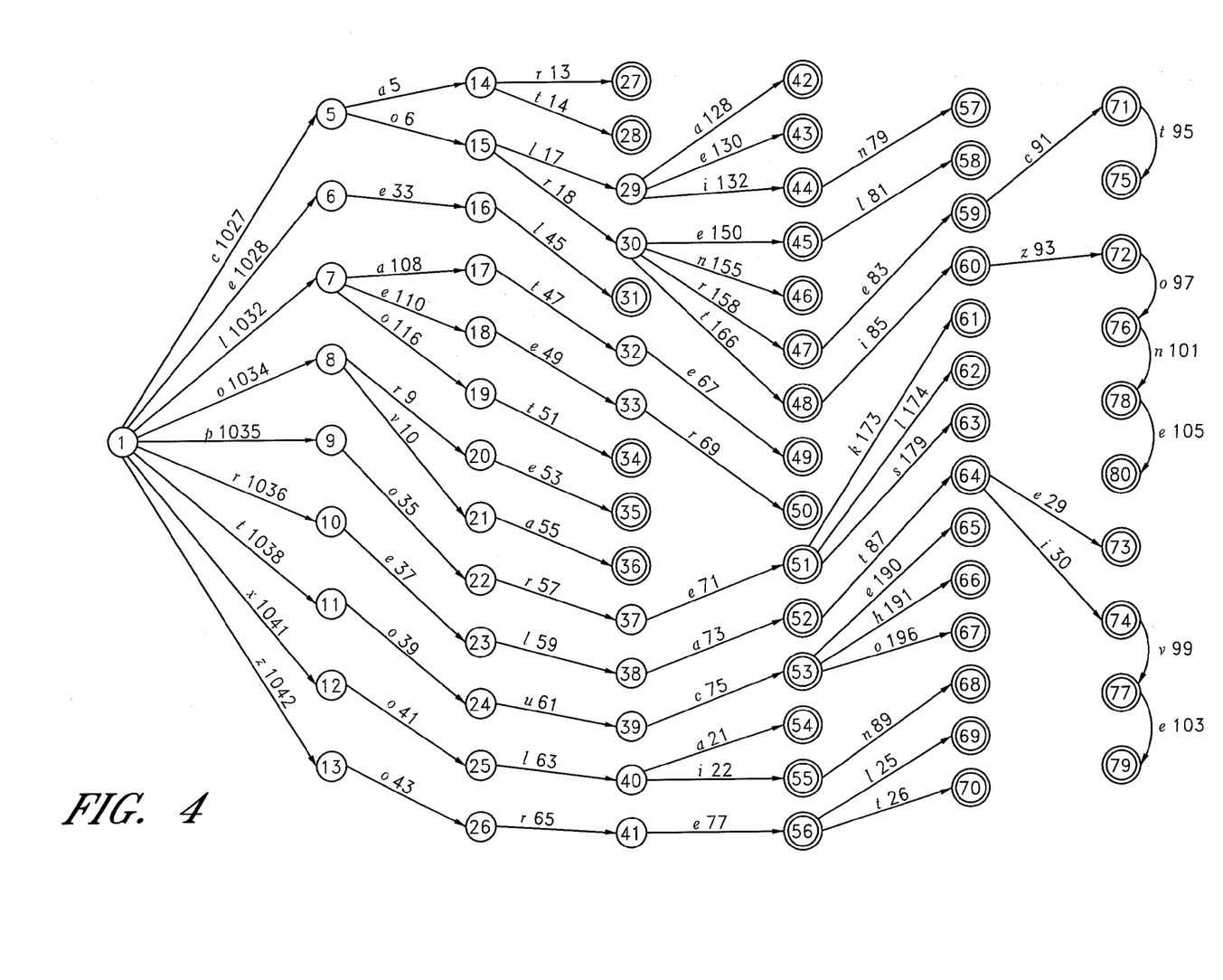
FIG. 4 is a diagram of an exemplary state machine that may be used to detect the patterns listed in FIG. 3.

FIG. 4 is diagram of an exemplary state machine that may be generated by the compiler 152 (FIG. 1) and used by the state machine engine 100 (FIG. 1) to detect the patterns listed in FIG. 3. In the embodiment of FIG. 4, each of the states is numbered, e.g., from state 1-79, and state transitions are labeled with a transition character and a memory address, or memory offset, in which the state transition instruction is stored in an exemplary memory. In the DFA of FIG. 4, character classes that represent one or more character or regular expressions may be generated by a DFA compiler. In other embodiments, character classes may not be used by the DFA.

Figure 5:
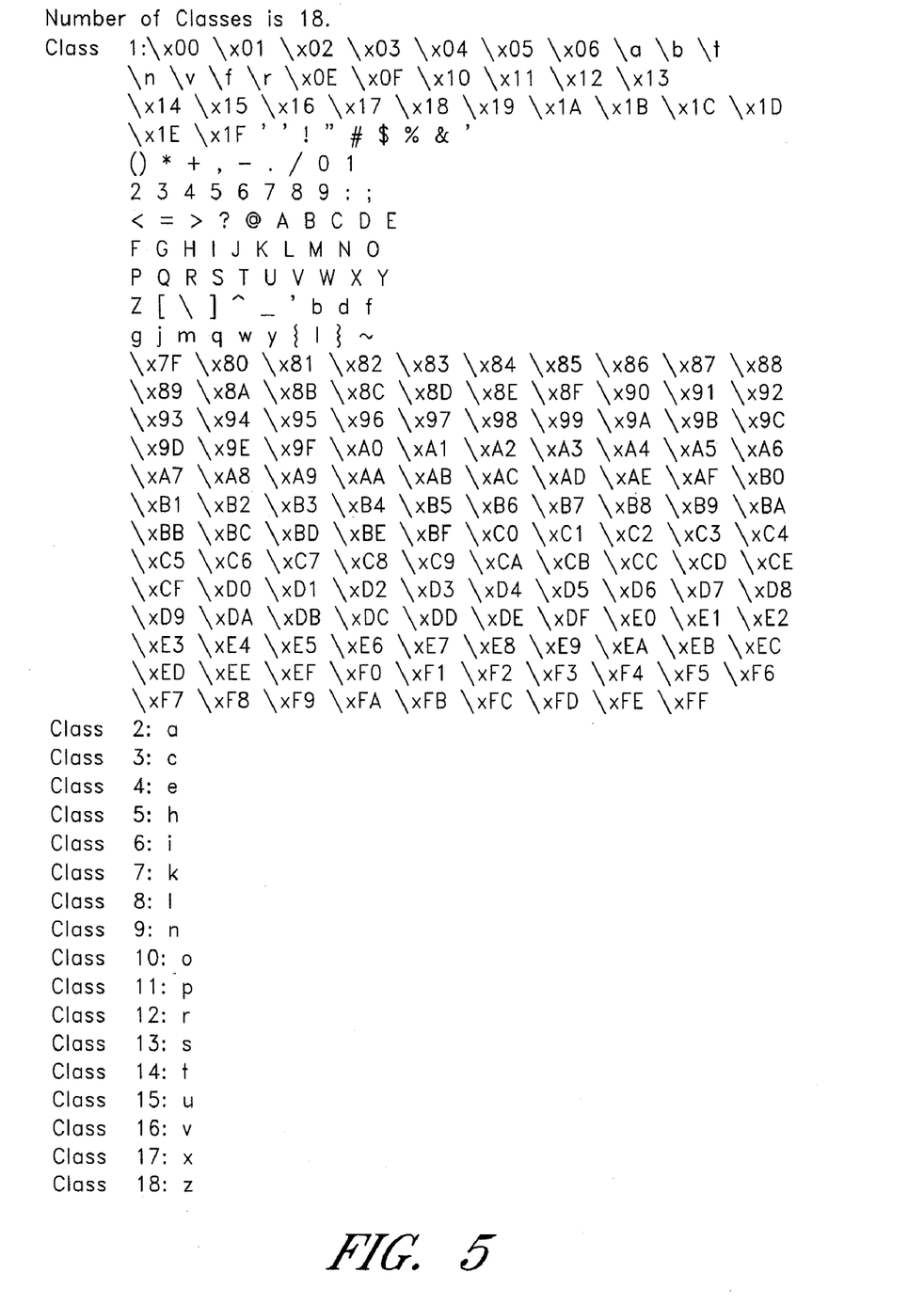
FIG. 5 is a list of exemplary character classes based on the list of patterns of FIG. 3.

In the embodiment of FIG. 4, the transition from start state 1 to state 8, is associated with a transition character of "o," which was assigned character class 10 (see FIG. 5). State 8 of the DFA has two possible out transitions, one on class 12 ("r") and the other on class 16 ("v"). Additionally, although not shown, each state may have a transition based on class 1 to a fail state, or returning to state 1. The addresses of the state transition instruction illustrated in the DFA of FIG. 4 may be determined by a compiler, partly in response to determining the transition conditions associated with transitions out of respective states. For example, in one embodiment, those state transitions associated with an equivalence class instruction may be assigned to a different memory address space than state transitions associated with TwoChar type instructions, such as state 8. Further description of various instruction types and character classes is found in U.S. Pre-grant Publication No. 2005/0273450, entitled "Regular expression acceleration engine and processing model," which is herein incorporated by reference in its entirety. In other embodiments, character classes may not be used at all, and the addresses of state transitions may be assigned sequentially as a compiler determines the transitions. Thus, in one embodiment, the 76 state transition instructions of the DFA of FIG. 4 may be stored in addresses from 0 to 75, or any offset thereof, in a memory. Other manners of mapping characters to character classes may be used in conjunction with the systems and methods described herein.

FIG. 5 is a list of exemplary character classes based on the list of patterns of FIG. 3. In the embodiment of FIG. 5, Class 1 corresponds to all the characters that aren't used in any of the expressions and so will lead to failure states. Alternatively, class 1 may loop back to the start state of the DFA. Classes 2 through 18 have one character per class. In the example of FIG. 3, due to the relatively short length of the literal strings and the small quantity of character strings, the use of character classes may not significantly impact the size and/or performance of the DFA, but for other input patterns, such as those associated with spam and viruses, for example, character classes may be used to reduce the number of transitions out of states by combining transition characters associated with particular states into single character classes. In other embodiments, character classes are not used.

Figure 6:
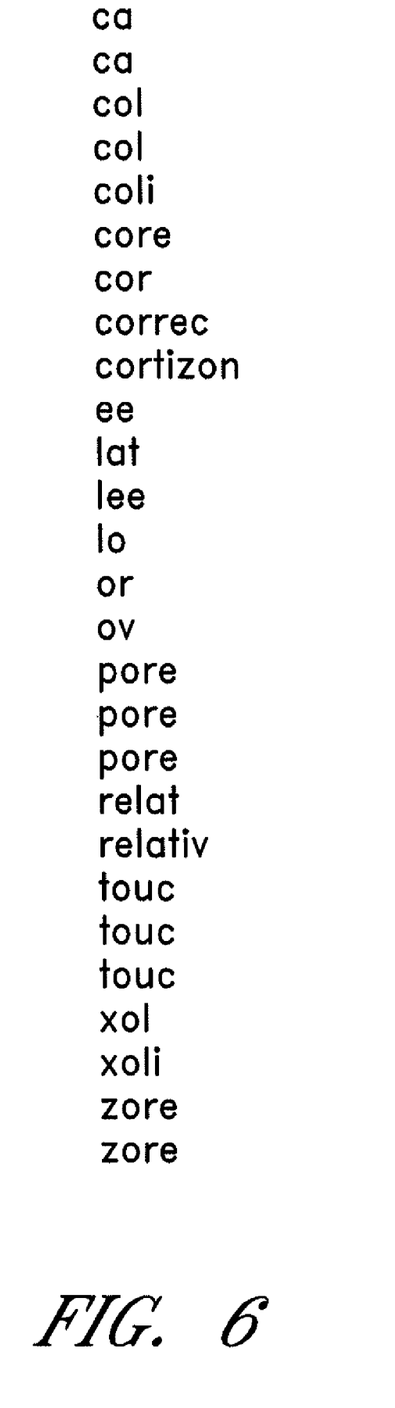
FIG. 6 is an exemplary test data string based on the patterns listed in FIG. 3.

FIG. 6 is an exemplary test data string based on the patterns listed in FIG. 3. The test data string may be generated and/or used by the cache prioritization module 152 of the compiler 150 (FIG. 1) or another computing device, such as in the system 100, in order to determine which addresses (comprising state transition instructions) are more frequently accessed. In the embodiment of FIG. 6, the last character of each of the literal strings of FIG. 3 has been removed. In other embodiments, the last character may be changed to a different character or the actual literal string may be used by the cache prioritization module 152.

Figure 7:
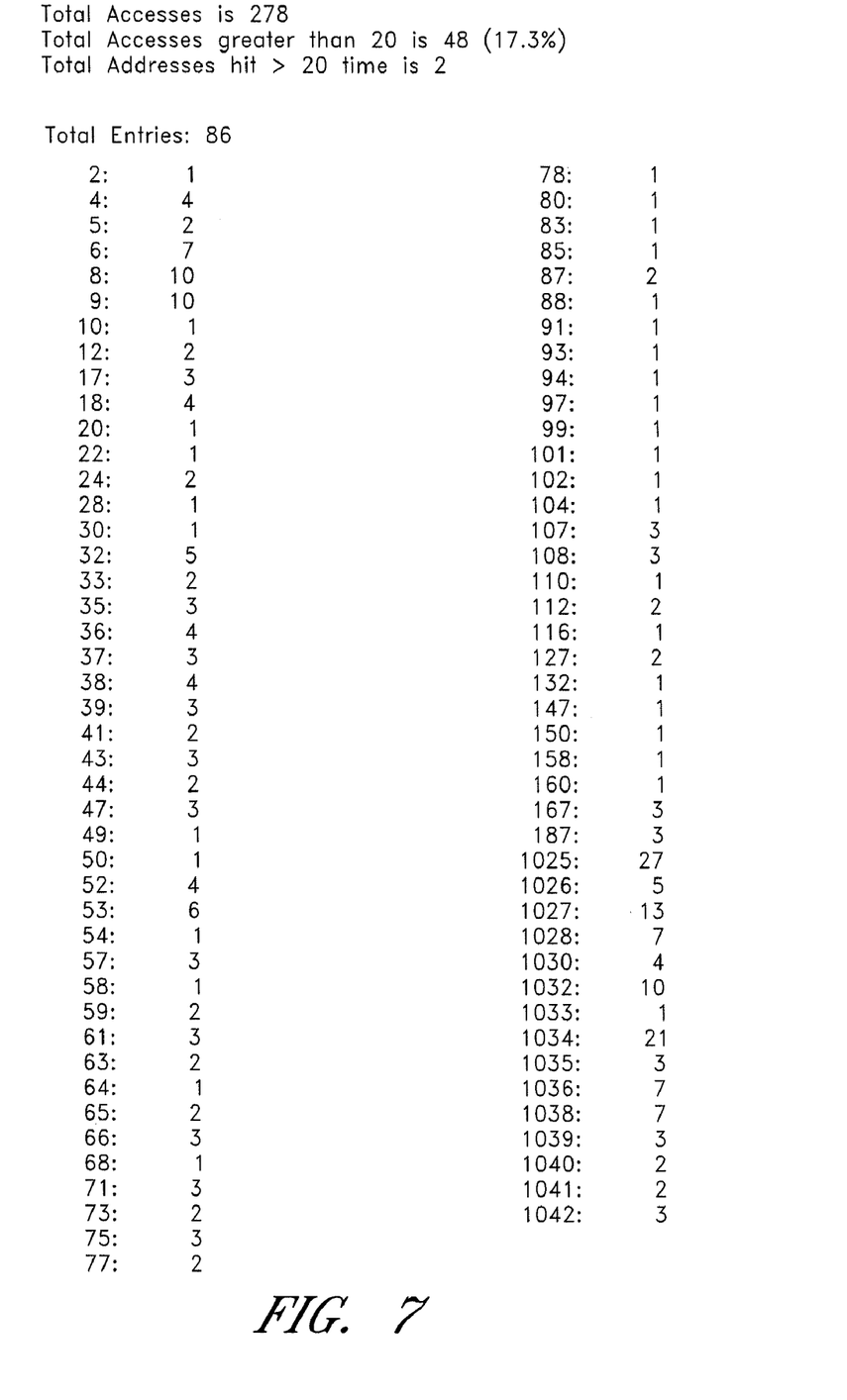
FIG. 7 is a list of the number of times respective exemplary states of the state machine in FIG. 4 is accessed when evaluating the exemplary test data string of FIG. 6.

FIG. 7 illustrates an exemplary list of the number of times each state is accessed when evaluating the exemplary test data string of FIG. 6. Thus, FIG. 7 illustrates counts of the number of times memory addresses storing state transition instructions are accessed when the test string of FIG. 6 is scanned. As illustrated in FIG. 7, certain transition instructions are accessed only once (e.g., at addresses 2, 10, 20, 22, etc.), while some are accessed 10 or more times (e.g., at addresses 8, 9, 1025, 1027, 1032, and 1034). For example, the entry for address 1034, which is associated with the transition for "o"

from the start state 1, has a count of 21. This count of 21 corresponds to the number of "o"s in the input test string. Similarly, the count for address 9, associated with the transition for "r" from state 8 to state 20, is 10. The test string of FIG. 6 comprises 10 instances of "o" followed by "r," or "or."

Thus, according to the systems and methods described above, certain states that are most accessed by the test string may be marked for locking by the cache prioritization module 152 (FIG. 1), for example, in order to reduce the effects of a spam, virus, or denial-of-service attack, for example. In the embodiment of FIGS. 3-7, the states with more than 10 accesses by the test string are in the first two transitions from the start state, but in other embodiments, more frequently accessed states in a DFA may occur more remote to the start state and, thus, would be less likely to be cached by a typical scanner. However, if the test string for such a DFA indicates that states remote to the start state are likely to be commonly accessed by a virus, spam, and/or a denial-of-service attack, for example, the states may be marked for permanent storage in the scanner cache according to the systems and methods described herein, and, thus, such remote states may be more quickly accessed in order to thereby reduce the effects of attempts to interfere with proper functioning of the network.

In certain embodiments, the states that are marked for locking in a cache may not include certain of the states that are at the head of the DFA (e.g., within 1-4 transitions of the start state). A brute force approach may cache all memory locations associated with the first x transitions from the start state. For other applications with thousands of rules, there may not be enough room in the cache to store even the first few, e.g., 2, 3, or 4 transitions. Thus, by using the systems and methods described herein, certain states that are at the head of the DFA (e.g., within 1-4 transitions of the start state) may be determined not to be the highest priority states for locking, thus freeing the cache for locking of other potentially more frequently accessed states that are further from the head of the DFA.

Figure 8A:
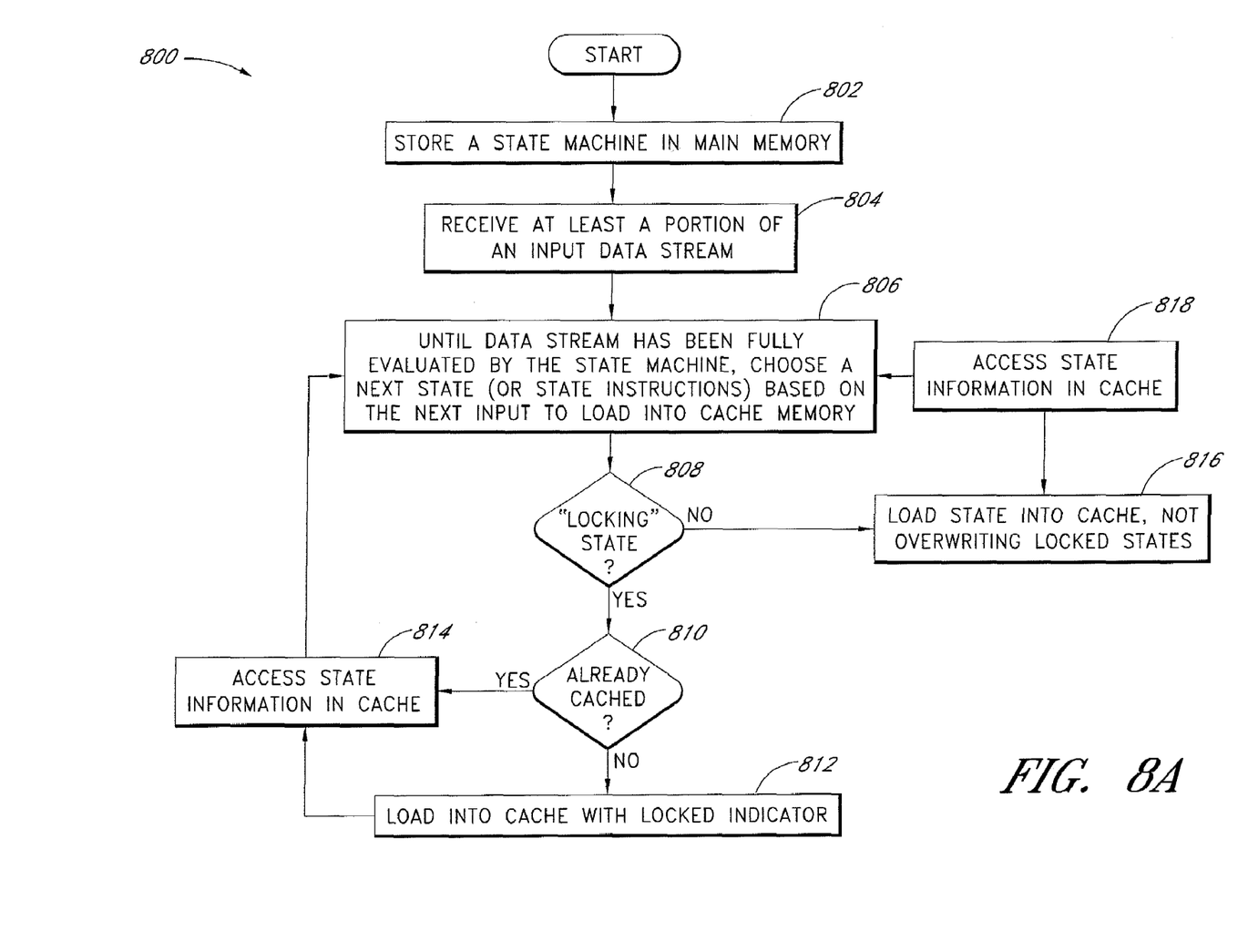
FIG. 8A is a flowchart illustrating one embodiment of a method of evaluating an input data string using the caching priority of certain states.

FIG. 8A is a flowchart illustrating one embodiment of a method of evaluating an input data string using the caching priority of certain states. In this embodiment, the method 800 begins in block 802 by storing a state machine in main memory 110 (FIG. 1), such as a state machine comprising prioritization indications that is received from the compiler 150. The state machine may correspond, for example, to patterns such as virus signatures, to be searched for in network traffic. Other patterns, including spam or denial-of-service attacks may also be used.

Next, in block 804, at least a portion of an input data stream 130 is received. The data stream may be, for example, network traffic being scanned. In other embodiments, the data stream may come from the hard drive of a personal computer being scanned for viruses or unwanted software, such as adware or malware.

In block 806, until the input data stream 130 has been fully evaluated by the system 100, the next state (or state instructions) to be loaded into the cache memory 108 is chosen based on the next input character of the data stream 130. The cache control module 112 may then determine whether this next state is a locking state, e.g., a state of high caching priority. If it is not a locking state, the method moves to block 816 and the state is loaded into the cache, not overwriting any higher priority locking states, to block 818 where the state information is made accessed at the cache 108, and the process returns to block 806 where the next state is chosen based on a next input character of the data stream 130.

If the cache control module 112 determines that the selected next state is a locking state, the process move to block 810 to determine if the state information is already cached. If the locking state has not previously been cached, the process moves to block 812 and the state information is loaded into the cache with a locked indicator and then to block 814 where the state information is accessible in the cache 108. If it is determined in block 810 that the locking state is already cached, the process may skip to block 814 where state information is made accessible from the cache 108. As above, the process returns to block 806 where the next state is determined based on the next input. This process may repeat indefinitely or until the input data stream has been fully evaluated by the state machine.

Figure 8B:
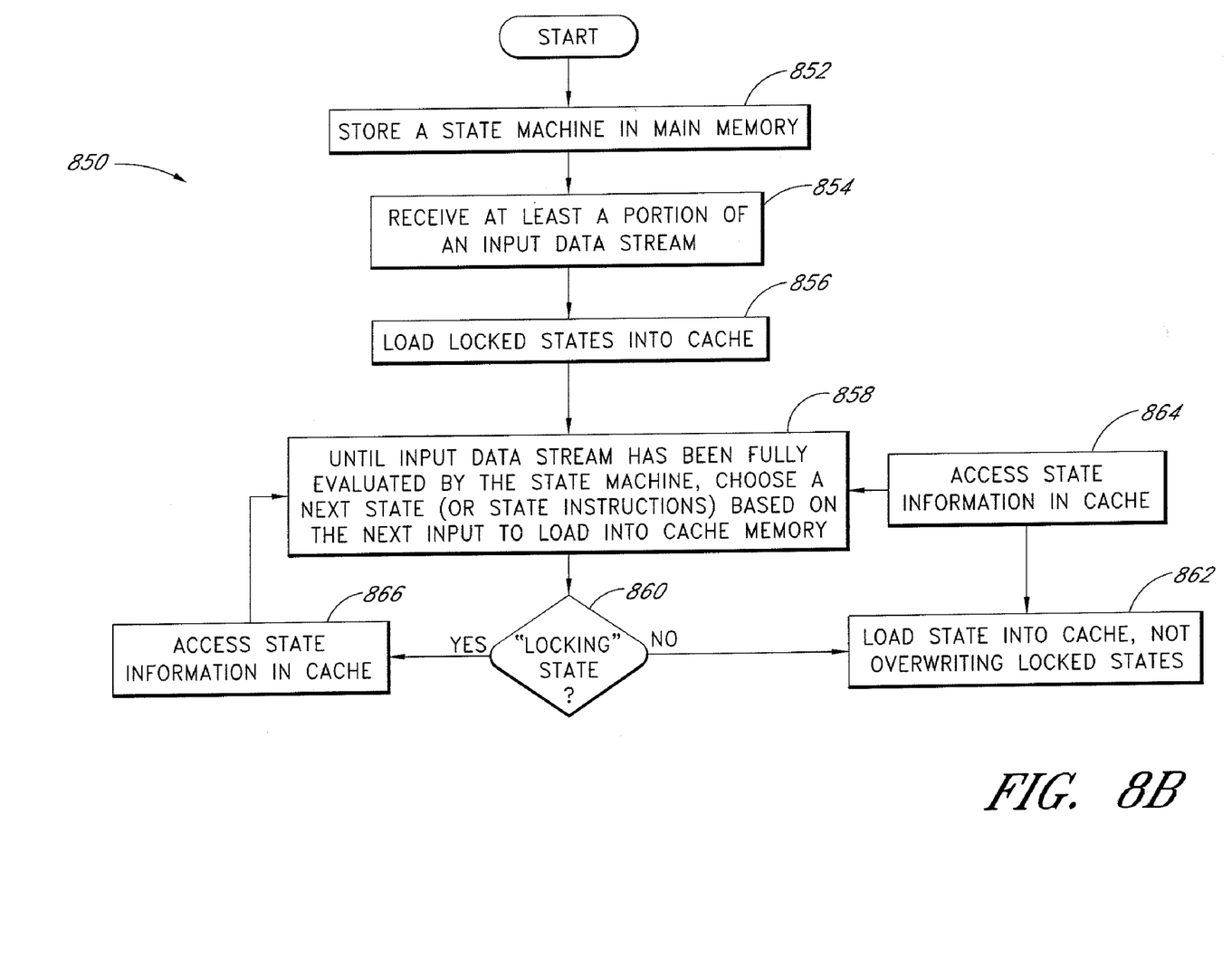
FIG. 8B is a flowchart illustrating another embodiment of a method of evaluating an input data string using the caching priority of certain states.

FIG. 8B is a flowchart illustrating another embodiment of a method of evaluating an input data string using the caching priority of certain states. This embodiment differs from the embodiment of FIG. 8A by loading the highest caching priority states into cache 108 before processing on the data stream 130 begins. The method 850 begins in block 852 by storing a state machine in main memory 110. In block 854, at least a portion of an input data stream 130 is received. In block 856, one or more locked states are pre-loaded into the cache 108. Blocks 854 and 856 could be in either order, and are reversed in some embodiments. After loading the indicated locked states, the process moves to block 858 and, until the portion of the input data stream 130 is fully evaluated by the state machine, the next state (or state instructions) to load into cache memory is chosen based on the next input character of the data stream 130.

In block 860, the cache control module 112 determines if the next state is a locking state. If so, the information may have previously been loaded into cache in block 856 and, thus, the process moves to block 866 where the state information can be directly accessed without any additional loading. In other embodiments, not all of the locked states can be pre-loaded into the cache 108 and, thus, the system 100 must check whether locked states are loaded into the cache 108.

If the next state is determined to not be a locking state in block 860, the process moves to block 862 where the state information is loaded into a free portion of the cache, not overwriting the locked states. In block 854, this state information is then accessed from the cache 108 and, again, the process returns to block 858 and the next state is chosen based on the next input character of the data stream 130. As described above, this process may repeat indefinitely or until the input data stream has been fully evaluated by the state machine.

Figure 9:
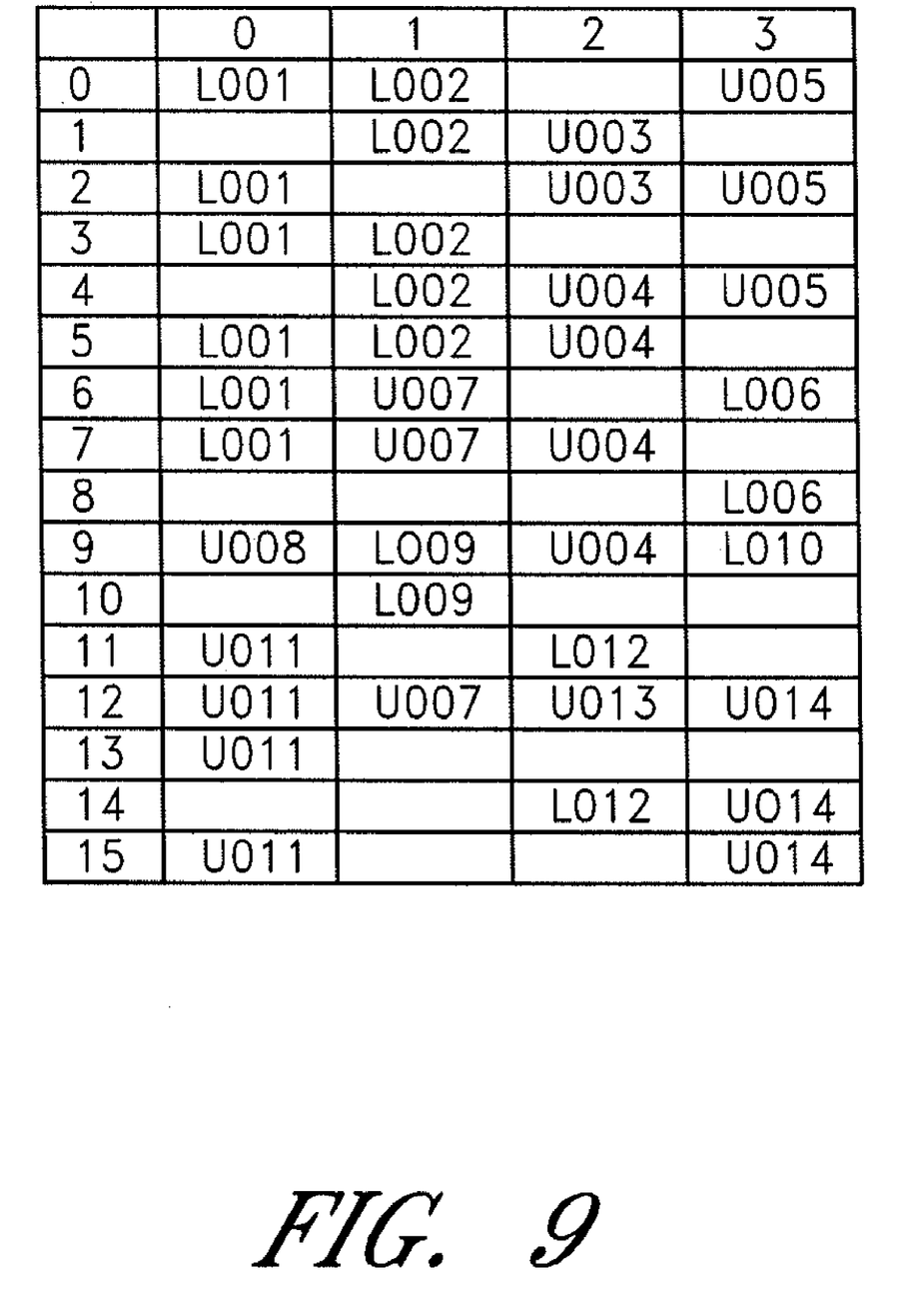
FIG. 9 is a diagram of locked and unlocked states stored into a cache memory.

FIG. 9 is a diagram of locked and unlocked states stored in a cache memory. Loading state instructions into a cache memory may involve careful allocation of the available memory slots. In some embodiments, state instructions for a given state may not occupy a contiguous portion of the cache memory. In the exemplary cache memory shown in FIG. 9, for example, locked state L001 occupies rows 0, 2-3, and 5-7 of column 0. In an N-way set associative memory (N=4 in FIG. 9), it may be beneficial to only allow a portion of the ways for any address to be locked at any one time. This prevents the cache memory from becoming "gridlocked", e.g., where so much of the memory is locked it may be impossible to find a location to load the next state into the memory. For example, in a four-way memory, only three ways for any address may be locked. By interleaving the states, more of the cache memory may be utilized. For example, in FIG. 9, unlocked state U007 occupies rows 6-7 and 12, whereas locked state L009 occupies rows 9 and 10 of the same column. Other methods may be employed to prevent a gridlock occurrence. For any given cache architecture, the compiler can assign memory address to locked instructions before assigning any other addresses, thereby having maximum flexibility in choosing addresses, so that slots in the cache are fully utilized without consuming all the available ways in any one row.

In one embodiment, the locked status of loaded states may expire, that is, if a locked state is not accessed from the cache after a given time, it may become unlocked. In non-binary caching priority schemes, the loaded state with the lowest caching priority may be overwritten by the next unloaded state. In some embodiments, caching priority is based on historical accessing of states, such that the test data stream is an actual data stream recently encountered by the state machine scanning algorithm. In embodiments where the locked states are loaded prior to the scanning of the input data stream, sophisticated pre-processing algorithms such as simulated annealing, the genetic algorithm, or brute force methods, may be employed to optimally load the locked states into the cache memory.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of associating respective caching properties to each of a plurality of states of a state machine, the method comprising:
    storing a state machine corresponding to one or more patterns to be detected in a data stream, wherein the state machine comprises a plurality of states;
    generating a test data stream based on the one or more patterns;
    traversing the state machine with the test data stream;
    determining respective hit quantities associated with each of the plurality of states, the hit quantities each indicating a number of accesses to a corresponding state by the traversing with the test data stream;
    associating a caching priority to at least some of the plurality of states based on the hit quantities of the respective states, wherein a particular caching priority is associated with only a predetermined quantity of states having the highest hit quantities, and wherein the caching priorities further comprise lockable and not lockable flag bits corresponding to initial locking and unlocking priority states based on the respective hit quantities;
    determining a set of states from the initial locking and unlocking priority states having updated locking priority for an initial cache memory load based on a predefined criteria related to at least one of a frequency of access, a frequency of use, percentage of cache memory available for preloading, and association with predefined signatures;
    loading the set of states having the updated locking priority into the cache memory before the state machine is traversed based on an input data stream;
    evaluating the input data stream with reference to the state machine;
    loading state transition instructions associated with respective states of the state machine into a cache memory as respective states are necessary for evaluation of the input data stream; and
    retaining the loaded state machine instructions in the cache memory until a state transition instruction with a higher priority is assigned for storage in a memory location of the loaded state machine instruction.

2. The method of claim 1, wherein the generated test data stream comprises one or more patterns.

3. The method of claim 1, wherein the generated test data stream comprises the one or more patterns.

4. The method of claim 3, wherein the portion of the one or more patterns comprises all characters of a pattern except a final N characters of the pattern.

5. The method of claim 4, wherein N is equal to 1, 2, 3, 4, or 5.

6. The method of claim 1, wherein the test data stream is generated using random number methods to produce a broad sample of representative patterns.

7. The method of claim 1, wherein the patterns to be detected comprise at least one of spam and virus patterns.

8. The method of claim 1, wherein the patterns to be detected comprise at least one of literal strings and regular expressions.

9. The method of claim 1, wherein the quantity of states in the first set is determined so that no more than a predetermined portion of the cache memory is loaded with the first set of states.

10. The method of claim 1, wherein the priorities comprise three or more priority levels.

11. The method of claim 1, wherein at least one of the state transition instructions indicates two or more characters on the input data stream that are associated with a state transition.

12. A method of detecting patterns in a data stream, the method comprising:
    storing, in a first memory, a state machine corresponding to one or more patterns to be detected in a data stream, wherein the state machine comprises a plurality of states each being associated with one or more state transition instructions;
    loading, into a second memory, one or more state transition instructions associated with a first state, wherein the second memory is configured to have faster access times than the first memory;
    loading, into the second memory, one or more state transition instructions associated with a second state, wherein memory locations storing the one or more state transition associated with the first state are not available for being overwritten with one or more state transition instructions associated with the second state unless the second state is associated with a higher caching priority than a caching priority of the first state, wherein the caching priorities i) are based on a predetermined hit quantity of each of the plurality of states, and ii) comprise lockable and not lockable priority flag bits corresponding to initial locking and unlocking priority states based on the respective hit quantities; and
    determining a set of states from the initial locking and unlocking priority states having updated locking priority for an initial cache memory load based on a predefined criteria related to at least one of a frequency of access, a frequency of use, percentage of cache memory available for preloading, and association with predefined signatures;
    loading a first plurality of state transition instructions associated with the set of states having the updated locking priority into the cache memory prior to evaluating a first character of the input data stream.

13. The method of claim 12, wherein the first state and second state are selected for storage in the cache memory based on characters of an input data stream.

14. The method of claim 12, wherein a first state transition instruction is associated with only one input character and a first transition state, such that when the one input character is received in the data stream while a first state associated with the first state transition instruction is active, the first transition state is activated.

15. The method of claim 14, wherein a second state transition instruction is associated with two or more input characters and a second transition state, such that when the two or more input respective input characters are sequentially received in the data stream while a second state associated with the second state transition instruction is active, the second transition state is activated.

16. The method of claim 15, wherein the two or more input characters are associated with a linear branch of the state machine.

17. A system for associating respective caching priorities to each of a plurality of states of a state machine, the system comprising:

a test data stream generator configured to generate a test data stream based on one or more patterns to be detected in a data stream;

an emulator configured to traverse the state machine with the test data stream and determine respective hit quantities associated with each of the plurality of states, the hit quantities each indicating a number of accesses to a corresponding state by the traversing with the test data stream;

a prioritizing module configured to associate a caching priority to at least some of the plurality of states based on the hit quantities of the respective states, wherein a particular caching priority is associated with only a predetermined quantity of states having the highest hit quantities, and wherein the caching priority further comprises a locking indicator and a non-locking indicator corresponding to initial locking and unlocking priority states based on the respective hit quantities, wherein the cache memory is configured to maintain any state transition instructions associated with locking indicators;

wherein the prioritizing module is configured to i) determine a set of states from the initial locking and unlocking priority states having updated locking priority for an initial cache memory load based on a predefined criteria related to at least one of a frequency of access, a frequency of use, percentage of cache memory available for preloading, and association with predefined signatures, and ii) load the set of states having the updated locking priority into the cache memory before the state machine is traversed based on an input data stream;

evaluating the input data stream with reference to the state machine;

an input interface for receiving a data stream comprising a plurality of characters;

a processor configured to traverse the state machine by determining state transitions associated with characters of the data stream; and a cache memory configured to i) store state transition instructions associated with respective states of the state machine as respective states are necessary for evaluation of the input data stream, and ii) retain the loaded state machine instructions until a state transition instruction with a higher priority is assigned for storage in a memory location of the loaded state machine instruction.

18. The system of claim 17, wherein a first subset of the states are associated with a first caching priority and a second subset of the states are associated with a second caching priority, wherein the first caching priority indicates that the associated state should not be replaced in a cache memory by a state associated with the second caching priority.

19. The system of claim 17, wherein one or more of the test data stream generator, the emulator, and the prioritizing module comprise software code configured for execution on a general purpose computer.

20. The system of claim 17, wherein the system comprises one or more of a network interface card, an application specific integrated circuit, a field programmable gate array, a multi-chip module, and a reconfigurable logic circuit.

* * * * *